(12) United States Patent
Kirchhofer

(10) Patent No.: US 9,089,996 B2
(45) Date of Patent: Jul. 28, 2015

(54) ROLLER COOLING DEVICE

(75) Inventor: Urs Kirchhofer, Sempach (CH)

(73) Assignee: BBA Innova AG, Aarau (CH)

( * ) Notice: Subject to any disclaimer, the term of this patent is extended or adjusted under 35 U.S.C. 154(b) by 550 days.

(21) Appl. No.: 13/500,187

(22) PCT Filed: Oct. 13, 2010

(86) PCT No.: PCT/CH2010/000252
§ 371 (c)(1),
(2), (4) Date: May 10, 2012

(87) PCT Pub. No.: WO2011/047491
PCT Pub. Date: Apr. 28, 2011

(65) Prior Publication Data
US 2012/0223168 A1 Sep. 6, 2012

(30) Foreign Application Priority Data
Oct. 20, 2009 (CH) ...................... 1600/09

(51) Int. Cl.
| | |
|---|---|
| *B02C 23/00* | (2006.01) |
| *B29B 9/04* | (2006.01) |
| *B29C 43/46* | (2006.01) |
| *B29C 43/52* | (2006.01) |
| *B29C 47/88* | (2006.01) |
| *B02C 15/00* | (2006.01) |
| *B29C 33/30* | (2006.01) |
| *B29C 47/00* | (2006.01) |
| *B29L 7/00* | (2006.01) |

(52) U.S. Cl.
CPC . *B29B 9/04* (2013.01); *B02C 23/00* (2013.01); *B29C 43/46* (2013.01); *B29C 43/52* (2013.01); *B29C 47/8845* (2013.01); *B02C 15/007* (2013.01); *B02C 2015/008* (2013.01); *B29C 33/306* (2013.01); *B29C 47/0011* (2013.01); *B29C 47/0021* (2013.01); *B29C 47/0038* (2013.01); *B29C 47/0066* (2013.01); *B29L 2007/008* (2013.01)

(58) Field of Classification Search
CPC .... B02C 15/00; B02C 2015/228; B02C 23/00
USPC ............................... 241/101.4, 285.1; 72/201
See application file for complete search history.

(56) References Cited

U.S. PATENT DOCUMENTS

| | | | |
|---|---|---|---|
| 3,153,435 A * | 10/1964 | Ober ................................ 241/74 |
| 3,310,086 A * | 3/1967 | Lasar ............................ 241/82.1 |
| 5,006,056 A | 4/1991 | Mainstone et al. |
| 5,277,108 A | 1/1994 | Akamatsu et al. |
| 6,598,448 B1 * | 7/2003 | Barten et al. .................... 72/201 |
| 2001/0027672 A1 * | 10/2001 | Barten ............................ 72/201 |

FOREIGN PATENT DOCUMENTS

| | | |
|---|---|---|
| DE | 20 2005 007 844 U1 | 9/2006 |
| JP | 03-143615 | 6/1991 |
| JP | 8-276489 | 10/1996 |
| JP | 2007-275907 | 10/2007 |

* cited by examiner

*Primary Examiner* — Faye Francis
(74) *Attorney, Agent, or Firm* — Morgan, Lewis & Bockius LLP

(57) ABSTRACT

The present invention relates to a roller cooling device for the continuous conversion of a hot flowable mass into solid chips by cooling, with at least one cooling roller, one crushing roller and one pressing belt, rotating via deflecting pulleys. The cooling roller and crushing roller serve for rolling out the mass into a thin film. The pressing belt runs on a part circumference of the cooling roller and serve for pressing the film against the cooling roller there. The parts are held from only one side and the rollers are mounted only on the same side and are driven from the same side, and in that said the parts are thereby accessible and/or demountable from the other side for cleaning purposes.

10 Claims, 3 Drawing Sheets

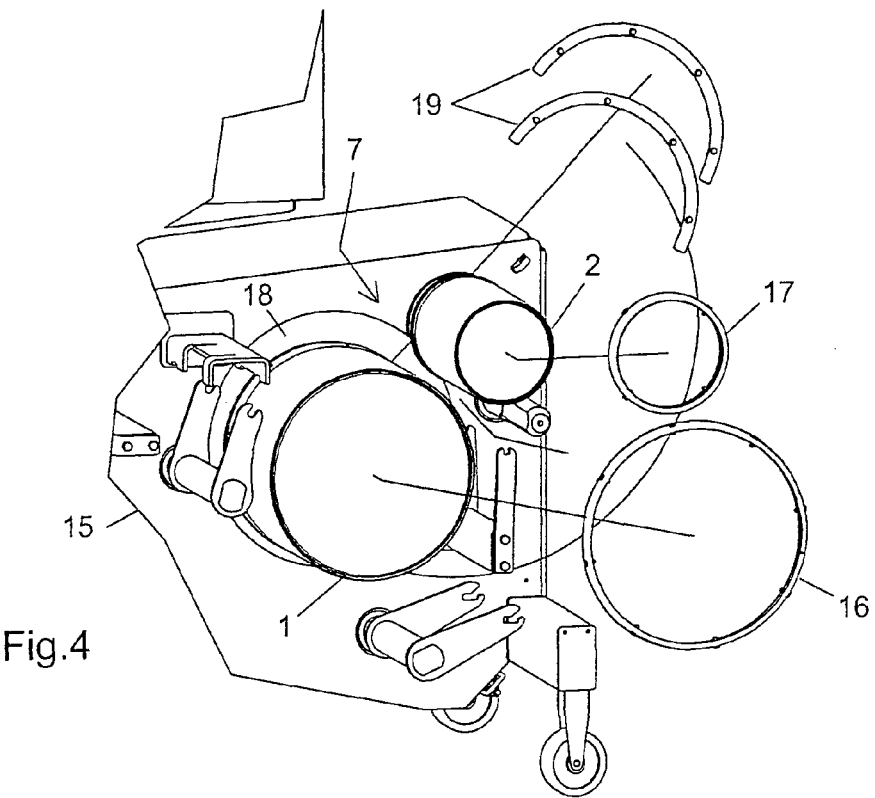
Fig.4
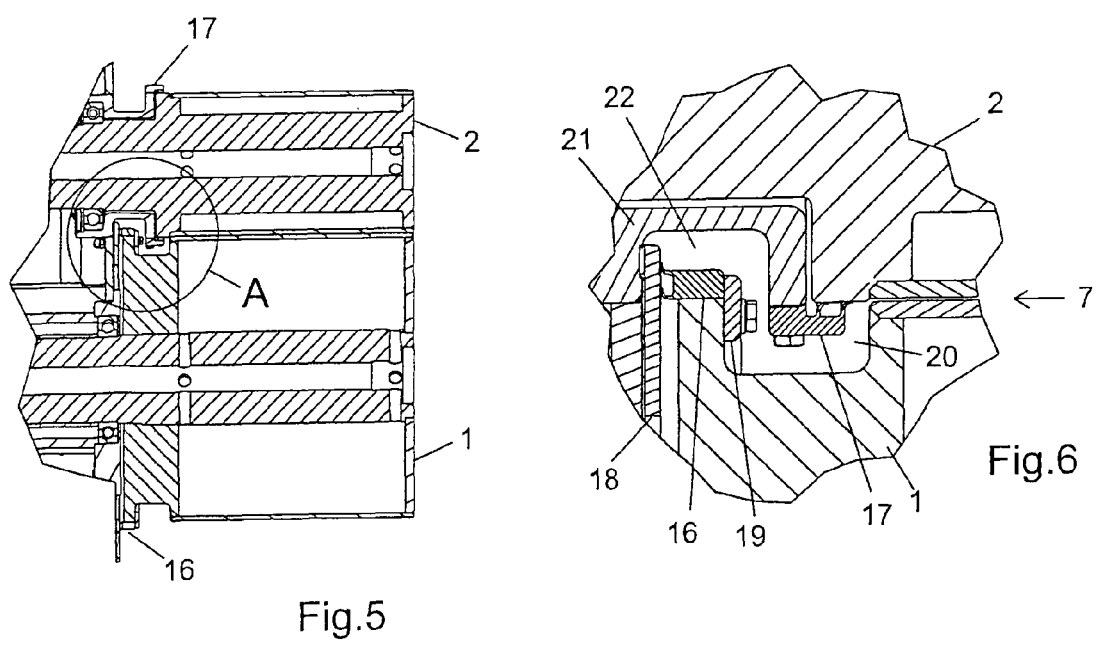
Fig.5
Fig.6

ROLLER COOLING DEVICE

The present application is a national stage of PCT International Application No. PCT/CH2010/000252, filed on Oct. 13, 2010, and claims priority to and benefit of Switzerland Patent Application No. 1600/09, filed Oct. 20, 2009, the entire content of which is incorporated herein by reference.

TECHNICAL FIELD

The present invention relates to a roller cooling device for the continuous conversion of a hot flowable mass into solid chips by cooling, with at least one cooling roller, one crushing roller and one pressing belt, rotating via deflecting pulleys. The cooling roller and crushing roller serve for rolling out the mass into a thin film. The pressing belt runs on a part circumference of the cooling roller and serves for pressing the film against the cooling roller there. There are usually also a stripper and a breaker present. The breaker serves for comminuting the film solidified on the cooling roller and detached from the cooling roller by the stripper.

PRIOR ART

Roller cooling devices of this type are known and are used in the chemical industry, for example for consolidating powder paints or toner mixtures. So that the forces acting upon said parts can be absorbed, the parts have to be held in a stable way. For this purpose, the parts, including the two rollers, are fastened or mounted on both sides, inter alia in a machine stand. Access to the parts for cleaning purposes is consequently at least impaired.

PRESENTATION OF THE INVENTION

Processing tasks, similar to those mentioned above, for roller coolers are found in the pharmaceutical and foodstuff industries. Here, however, the requirements for cleaning the device are appreciably more stringent. Cleaning must be able to be carried out more frequently and also more thoroughly. The object of the invention, therefore, is to specify a roller cooling device which can be cleaned more simply and more thoroughly than those which are known. This object is achieved by means of the features of claim 1. The roller cooling device according to the invention is accordingly characterized in that the cooling roller, the crushing roller, the deflecting pulleys and the pressing belt are held from only one side and the rollers are mounted only on this side and are driven from this side, and in that said parts are thereby accessible and/or demountable from the other side for cleaning purposes.

Preferred embodiments of the invention are specified in the dependent claims.

Accordingly, the roller cooling device is preferably provided, further, with a stripper and a breaker, the breaker serving for comminuting the film solidified on the cooling roller and detached from the cooling roller by the stripper. These parts, too, are held only from said side, the breaker being driven only from this side. These parts are, accessible and/or demountable from the other side for cleaning purposes.

The cooling roller and crushing roller are preferably sealed off in each case with respect to their bearings, drives and other supply equipment by means of a seal on a partition, these seals likewise being demountable toward the other side.

The two seals in each case preferably comprise a sealing ring, and, for the purpose of demounting these sealing rings, the cooling roller and crushing roller are adjustable relative to one another between an operating position with a small roller nip and a mounting position with a larger roller nip.

The sealing ring of a first of the two rollers, preferably of the cooling roller, may in this case be fixed to this roller adjacently to the partition and seal slideably with respect to the partition.

For adjustment between the operating position and mounting position, preferably also only the first roller is mounted movably, for example via an eccentric. During an adjustment of this roller, its sealing ring slides along the partition.

In this case, the sealing ring of the other roller can be fixed, at a distance from the partition, to a holding ring connected to the partition and seal slideably on the other roller.

So that the two sealing rings do not collide with one another when the two rollers are in the operating position, one roller is preferably provided with a continuous indentation, into which the sealing ring of the other roller engages in the operating position. Correspondingly, the other roller is likewise provided with an indentation or with an identically acting tapering of its circumference, into which the above-mentioned holding ring is also inserted and into which the sealing ring of the one roller engages in the operating position.

Since the cooling roller and crushing roller have in each case smooth surfaces which are easy to clean, they also do not need to be demountable for cleaning purposes. They may be mounted fixedly, apart from their mutual adjustability between the operating position and mounting position, which is advantageous in structural terms with regard to their mounting and to the connection of at least the cooling roller to a cooling liquid circuit.

The term "mounted fixedly" is to be understood in the present context as meaning, in contrast to "demountable", parts which are demountable at least not simply, and also not as intended, by the user of the device and, in particular, not regularly for cleaning purposes. Of course, even these parts can be demounted somehow, although this demounting is to be possible or advisable only by the manufacturer, is to be possible with special knowledge or a special tool or is at least to be more time-consuming. Preferably, moreover, the demountable parts of those mentioned are demountable at least essentially without a tool.

Finally, a preferably traveling and therefore easily movable protective cowl may also be provided for covering said parts.

BRIEF EXPLANATION OF THE FIGURES

The invention will be explained in more detail below by means of an exemplary embodiment in conjunction with the drawing, in which:

FIG. 4 shows an exploded drawing of only the region with the two rollers of the device of FIG. 1;

FIG. 5 shows a section through the two rollers; and

FIG. 6 shows a detail A from FIG. 4 in an enlarged illustration.

WAYS OF IMPLEMENTING THE INVENTION

Figure 1:
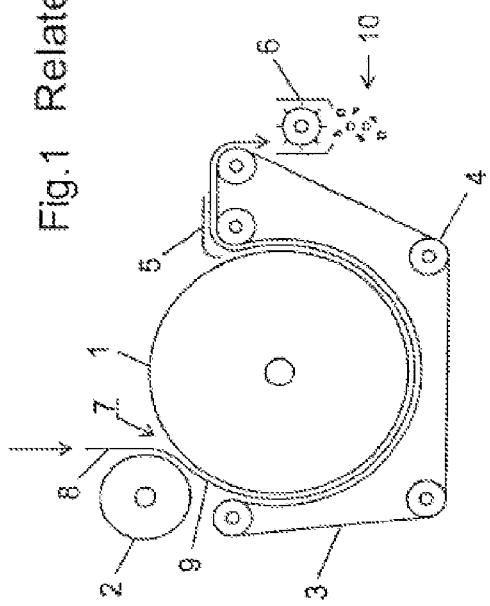
FIG. 1 shows the functional principle of a roller cooling device.

FIG. 1 shows diagrammatically the functional principle of a roller cooling device for the continuous conversion of a hot flowable mass into solid chips by cooling, the below-described roller cooling device according to the invention also being based on said functional principle. A cooling roller is designated by 1, a crushing roller by 2, a pressing belt by 3, one of five deflecting pulleys for the pressing belt by 4, a stripper by 5 and a breaker by 6.

The roller cooling device of FIG. 1 functions as follows: a strand 8 of a hot, for example thermoplastic, mass, which is flowable, but solidifies at relatively low temperature, is introduced into the roller nip 7 between the cooling roller 1 and crushing roller 2 and is rolled out by the two rollers into a thin film 9 extending over almost the entire width of the rollers. The strand 8 could, for example, come from an extruder and have a pasty consistency. The film 9 runs along a part circumference of the cooling roller 1, at the same time being held by the pressing belt 3 in bearing contact against the cooling roller 1. The cooling roller 1 is cooled by a coolant flowing through it. The cooling roller 1 is thereby capable of absorbing and dissipating heat from the film 9. By being cooled in this way, the film 9 begins to solidify. The at least partially already solidified film 9 is detached from the cooling roller 1 by means of the stripper 6 and is subsequently delivered to the breaker 7 by means of which it is broken up into individual pieces. The chips 10 which are formed here fall downward and are collected, for example, in a container, not illustrated.

Figure 2:
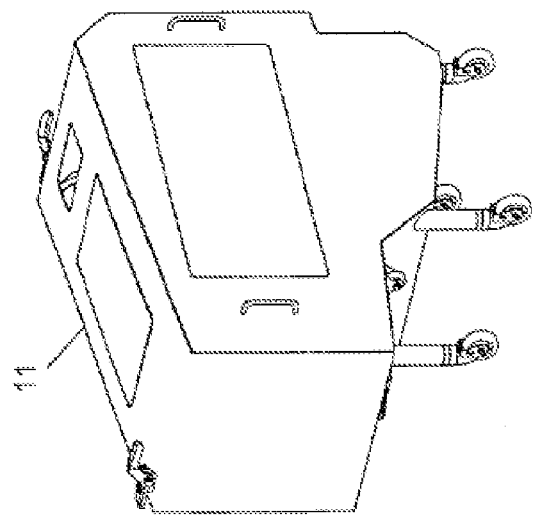
FIG. 2 shows a device according to the invention with the protective cowl removed.
Figure 2:
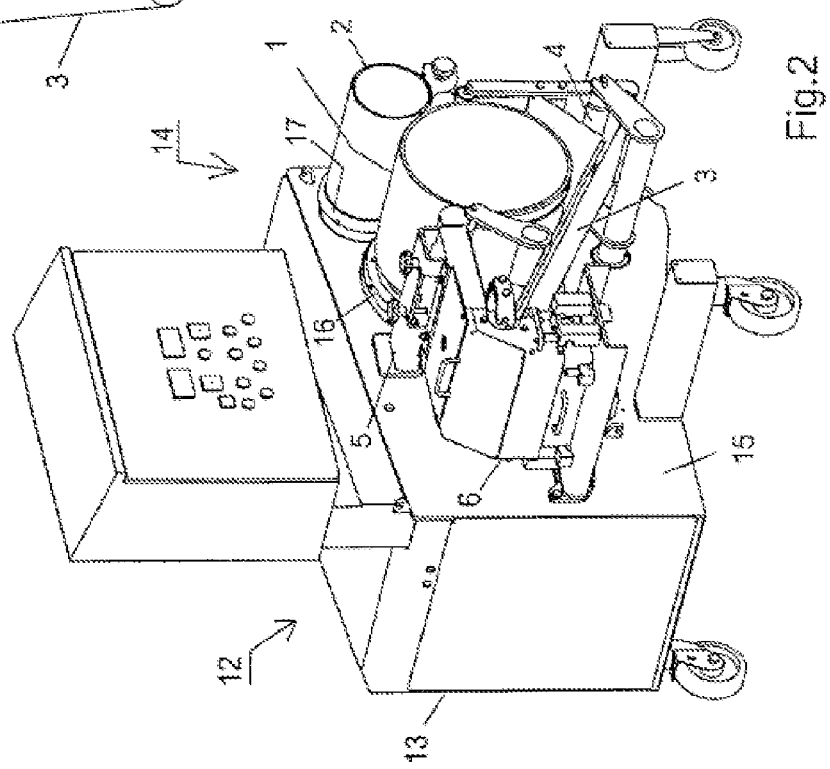

FIG. 2 shows a device according to the invention based on the principle explained above, reference symbols 1-6 being used again for the parts already mentioned above. A protective cowl 11 covering these parts while the device is in operation is illustrated laterally next to the device so as to expose a view of the latter. The protective cowl is mounted on castors and can consequently be removed in a simple way.

What is characteristic of the device according to the invention is that the parts 1-6 are held only on one side or, via holders, only from one side on a machine stand 12. The rollers (1, 2), too, are mounted only on this side and are driven from this side. The parts (1-6) are thereby easily accessible and/or demountable from the other side for cleaning purposes.

The machine space 13 of the machine stand 12 contains not only the bearings for the two rollers 1 and 2 and their drives, but, inter alia, also the installations for supplying the cooling roller 1 with the cooling liquid. As is clear from FIGS. 2 and 3, the machine stand 12 has a relatively large depth in the axial direction of the rollers 1, 2, since the two rollers are in each case mounted therein in two spaced-apart bearings for stability reasons.

A partition 15 is present for separating the process region 14 having the parts 1-6 from the machine space 13. Said partition also serves as a mounting surface for individual parts in the process region 14, such as, for example, holders for the deflecting pulleys 4 and the breaker 6. Insofar as other parts, such as, for example, the shafts of the two rollers 1 and 2 or the driveshaft for the breaker 6, are led through the partition 15, seals are present in the region of the partition. The special design of the two roller seals is explained in more detail below.

Figure 3:
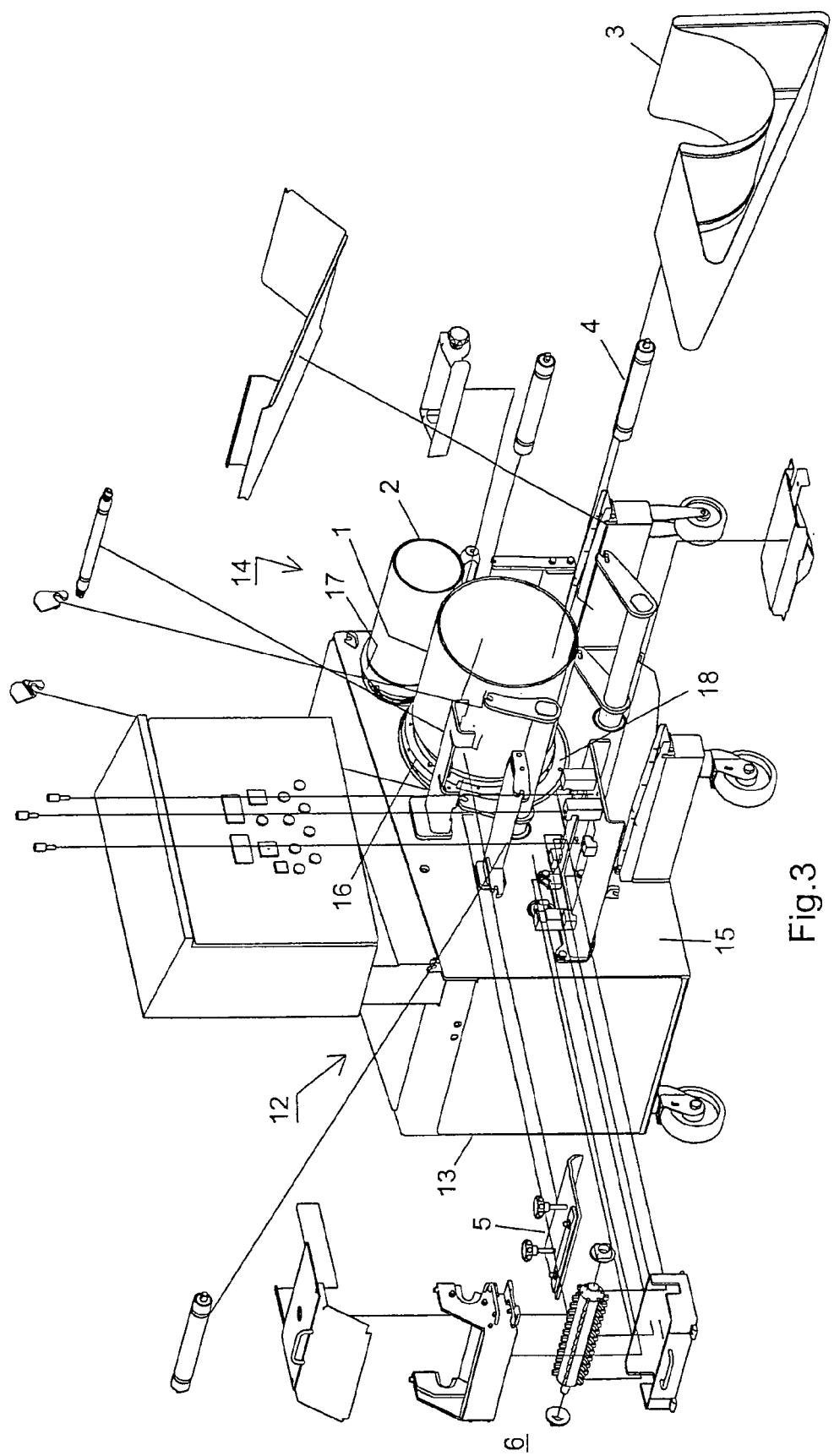
FIG. 3 shows an exploded drawing of the device of FIG. 1.

FIG. 3 shows in an exploded illustration how various parts in the process region 14 are demountable for cleaning purposes, and, with the exception of the two rollers 1 and 2, in particular, those parts which come into direct contact with the material to be processed can be removed. As can likewise be gathered from FIG. 3, the demounting of the demountable parts (apart from the screw connections yet to be described) can be carried out without a tool, since the corresponding parts are simply plugged in or, like the deflecting pulleys 4, suspended in the legs of their u-shaped holders and, if necessary, are secured by means of pins capable of being withdrawn in a simple way. To demount the pressing belt 3, the deflecting pulley, designated by 4 in FIG. 3, which has the function of a tension pulley, is pivoted laterally by its u-shaped holder being rotated, with the result that the pressing belt 3 is slackened and can be withdrawn forward.

Although the two rollers 1 and 2 themselves are not demountable, their seals with respect to the partition 15, which seals have already been referred to, are in fact demountable. As can be gathered from FIG. 4, these seals comprise on the cooling roller 1 a sealing ring 16 and on the crushing roller 2 a sealing ring 17. These sealing rings 16, 17 are dimensioned in terms of their inside diameter such that they can in each case just be pushed over the circumferential surface of their respective rollers 1 and 2.

As can be seen in FIGS. 5 and 6, the sealing ring 16 is arranged on the circumference of the cooling roller 1 adjacently to the partition 15. It seals there, on the one hand, with respect to the circumferential surface of the cooling roller 1 and, on the other hand, with a pair of flexible sealing lips, slideably with respect to the partition 15. For this purpose, a sealing surface 18 is present on the partition 15, in the present exemplary embodiment this sealing surface being implemented by an extra part fastened to the partition 15. Two half rings 19 are used to fix the sealing ring 16 in its illustrated position and to maintain a pressing force with respect to the sealing surface 18, which half rings 19 are screwed in the axial direction to the inner side face of an indentation 20 present in the circumference of the cooling roller 1. In addition, the sealing ring 16 can also be fastened, for example likewise by means of screws (not illustrated), to the circumferential surface of the cooling roller 1 and be pressed against this in the radial direction.

The sealing ring 17 for the crushing roller 2 is arranged, at a distance from the partition 15, on a holding ring 21 sealingly connected, in particular welded, to the partition 15, more specifically on an outwardly bent marginal strip of this holding ring. It seals, on the one hand, with respect to the holding ring 21 and, on the other hand, with a pair of flexible sealing lips, slideably on the circumferential surface of the crushing roller 2. The sealing ring 17 is fixed on the holding ring 21 by means of radial screws.

As can be seen clearly in FIG. 6, the two sealing rings 16 and 17 overlap one another in the radial direction in the region of the machine stand-side prolongation of the roller nip 7, the crushing roller sealing ring 17 engaging into the already mentioned indentation 20 in the cooling roller 1, and conversely the cooling roller sealing ring 16 engaging into a corresponding indentation (or a machine stand-side tapering) 22 of the crushing roller 2. The holding ring 21 is also inserted into this indentation 22, in such a way that said holding ring surrounds the cooling roller sealing ring 16. By virtue of this design, the two sealing rings 16 and 17 do not collide with one another.

In the arrangement described above, the two sealing rings 16, 17 cannot be demounted directly on account of the narrow roller nip 7. For this purpose, first, the roller nip 7 has to be enlarged. This is achieved by means of the lateral displacement of at least one roller, of the cooling roller 1 in the present exemplary embodiment. In a way not illustrated, the cooling roller 1 is displaced via eccentric mounting in the machine stand, the cooling roller sealing ring 16 sliding along the sealing surface 18 on the partition 15, said sealing surface having to be designed to be suitably simple and large enough for this purpose. FIG. 4 shows a detail of the device according to the invention with the two rollers 1, 2 in their mounting position, with a wide roller nip 7. The displacement of the cooling roller along the sealing surface 18 is clear from a comparison with its operating position illustrated in FIG. 3.

In the mounting position according to FIG. 4, the two sealing rings 16 and 17 can be successively demounted by sliding over their respective rollers 1, 2 after the removal of the radial screws and of the half rings 19.

By virtue of their design described above, the parts of the device according to the invention which come into contact with the product can in any event be demounted in a simple way. In the demounted state, they can easily be cleaned individually. Sufficient space is obtained between the remaining parts to also be able to clean these effectively.

The invention claimed is:

1. A roller cooling device for the continuous conversion of a hot flowable mass into solid chips by cooling, comprising:
    at least one cooling roller, one crushing roller and one pressing belt;
    the cooling roller and the crushing roller configured to roll out the mass into a film; and
    the pressing belt configured to rotate via deflecting pulleys and run on a part circumference of the cooling roller and to press the film against the cooling roller;
    wherein the pressing belt and the deflecting pulleys are held from only one side of the roller cooling device and the cooling roller and the crushing roller are mounted only on and are driven from the one side, and thereby the pressing belt, the deflecting pulleys, the cooling roller, and the crushing roller are accessible and/or demountable from an other side opposite to the one side for cleaning purposes.

2. The roller cooling device as claimed in claim 1, further comprising:
    a stripper configured to detach the film from the cooling roller; and
    a breaker configured to comminute the film solidified on the cooling roller;
    wherein the stripper and the breaker are held only from said one side and the breaker is driven only from the one side, and thereby the stripper and said breaker are accessible and/or demountable from the other side for cleaning purposes.

3. The roller cooling device as claimed in claim 1, wherein the cooling roller and the crushing roller are sealed off in each case with respect to their bearings and driven by means of a seal on a partition, and,
    wherein the seals are likewise demountable toward the other side.

4. The roller cooling device as claimed in claim 3, wherein the seals in each case comprise a sealing ring, and the cooling roller and crushing roller are adjustable relative to one another between an operating position with a small roller nip and a mounting position with a larger roller nip for demounting the sealing rings.

5. The roller cooling device as claimed in claim 4, wherein the sealing ring of one of the two rollers is fixed to the roller adjacently to the partition and seals slideably with respect to the partition.

6. The roller cooling device as claimed in claim 5, wherein, for adjustment between the operating position and mounting position, only one roller is mounted movably and during an adjustment of this roller, its sealing ring slides along the partition.

7. The roller cooling device as claimed in claim 5, wherein the sealing ring of the other roller is fixed, at a distance from the partition, to a holding ring connected to the partition and seals slideably on the other roller.

8. The roller cooling device as claimed in claim 7, wherein one roller is provided with a continuous indentation, into which the sealing ring of the other roller engages in the operating position, and the other roller is likewise provided with an indentation, into which the sealing ring of the one roller engages in the operating position.

9. The roller cooling device as claimed in claim 3, wherein the cooling roller and crushing roller are mounted fixedly, apart from their mutual adjustability between the operating position and mounting position.

10. The roller cooling device as claimed in claim 1, wherein the parts are covered by a traveling protective cowl.

\* \* \* \* \*